Sept. 13, 1949.　　　　B. JAPIKSE　　　　2,481,670
PRESS MECHANISM

Filed May 15, 1945　　　　　　　　　　　10 Sheets-Sheet 1

INVENTOR.
BY Bertrand Japikse
his Attorney

Sept. 13, 1949.　　　　B. JAPIKSE　　　　2,481,670
PRESS MECHANISM

Filed May 15, 1945　　　　　　　　　　　10 Sheets-Sheet 3

INVENTOR.
Bertrand Japikse
BY
his Attorney

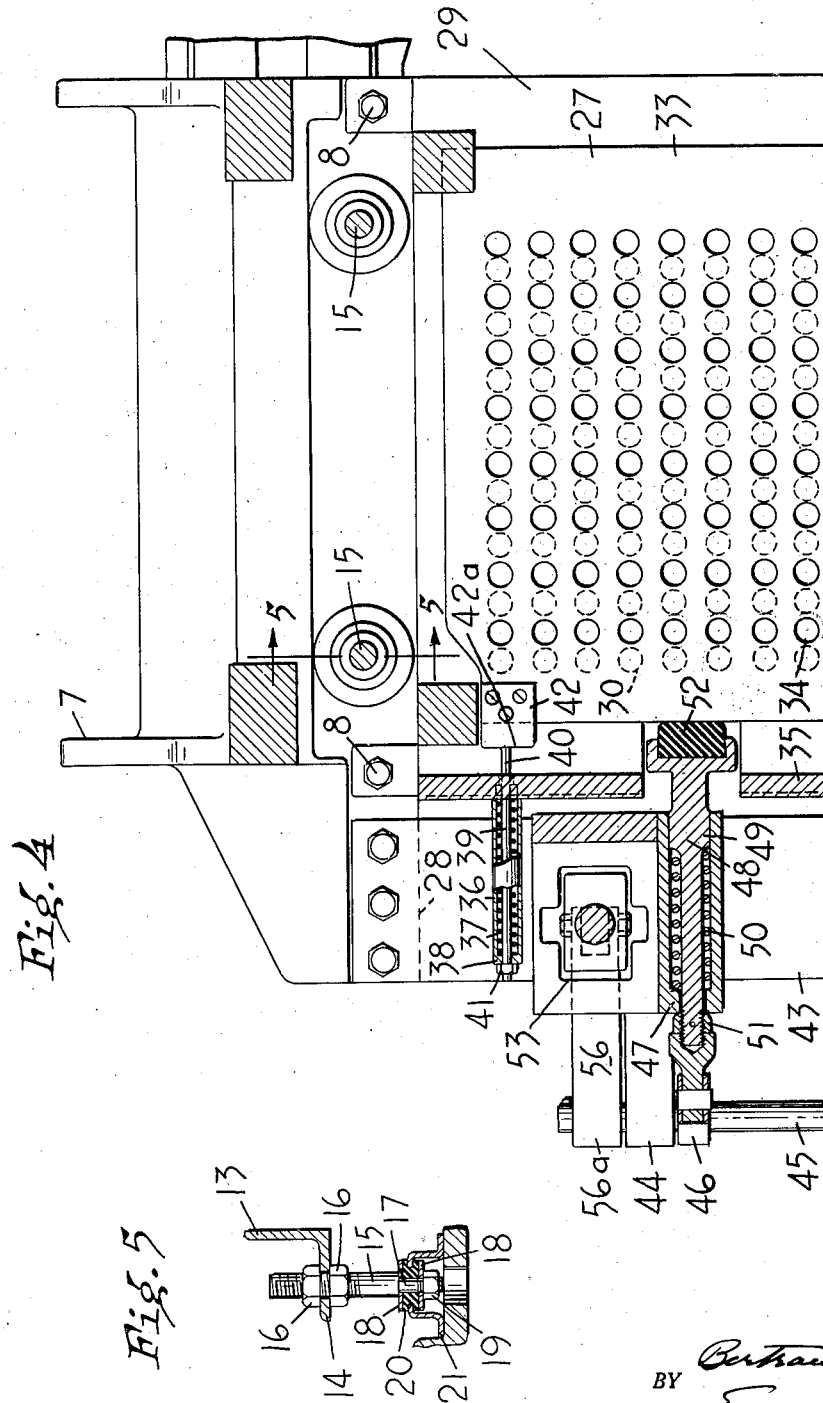

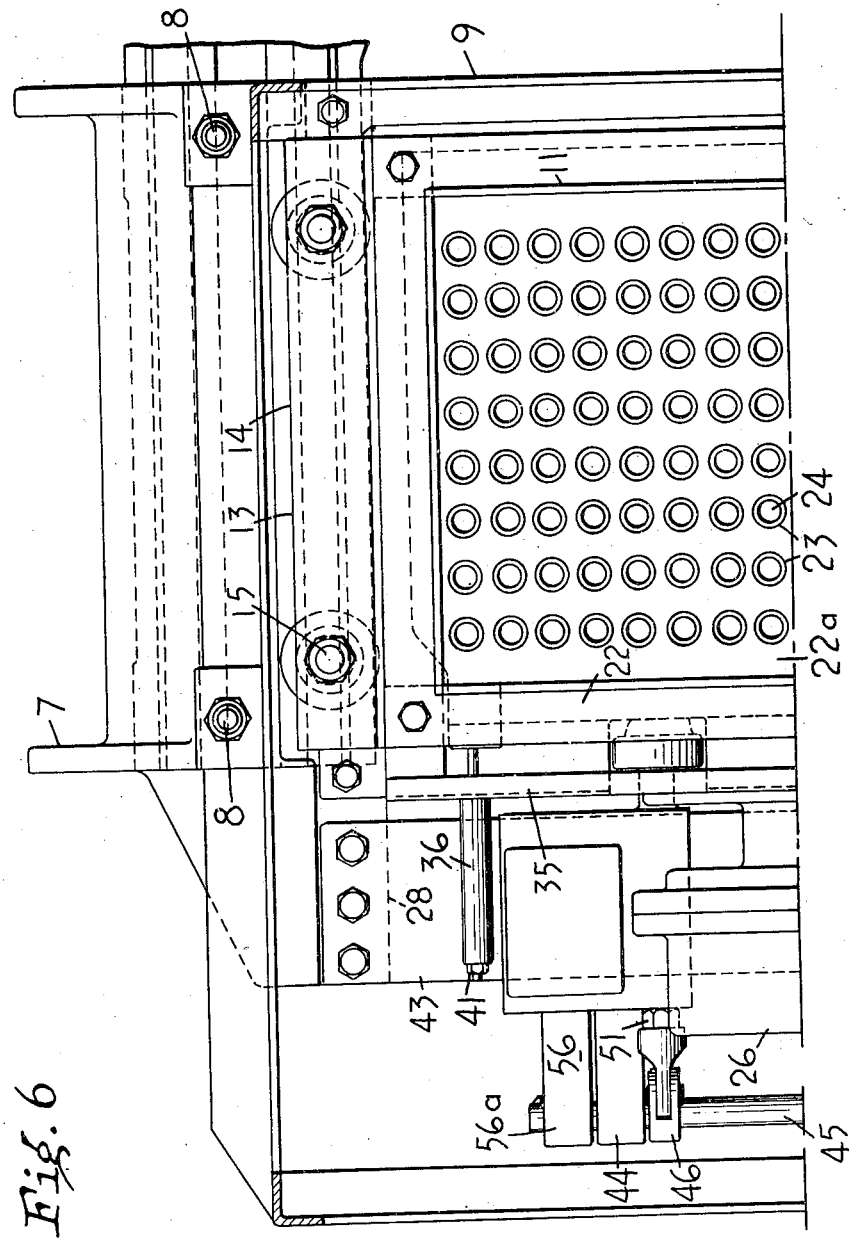

Sept. 13, 1949.   B. JAPIKSE   2,481,670
PRESS MECHANISM
Filed May 15, 1945   10 Sheets-Sheet 6

INVENTOR.
BY Bertrand Japikse
his Attorney

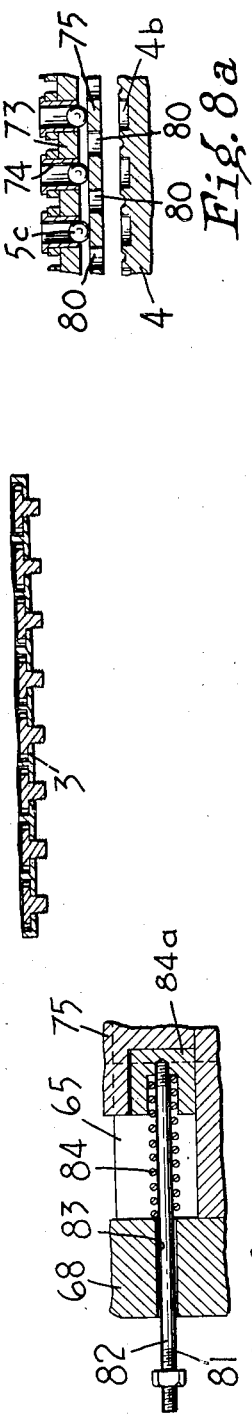
Sept. 13, 1949. B. JAPIKSE 2,481,670
PRESS MECHANISM
Filed May 15, 1945 10 Sheets-Sheet 7
INVENTOR.
Bertrand Japikse
BY
his Attorney Sept. 13, 1949.  B. JAPIKSE  2,481,670
PRESS MECHANISM
Filed May 15, 1945  10 Sheets-Sheet 8
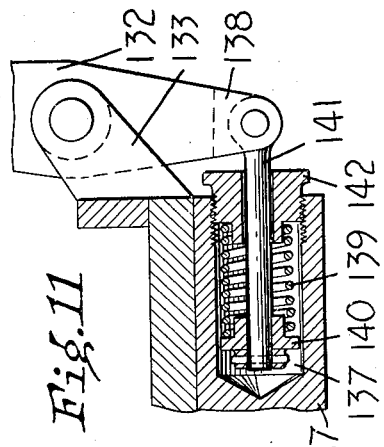
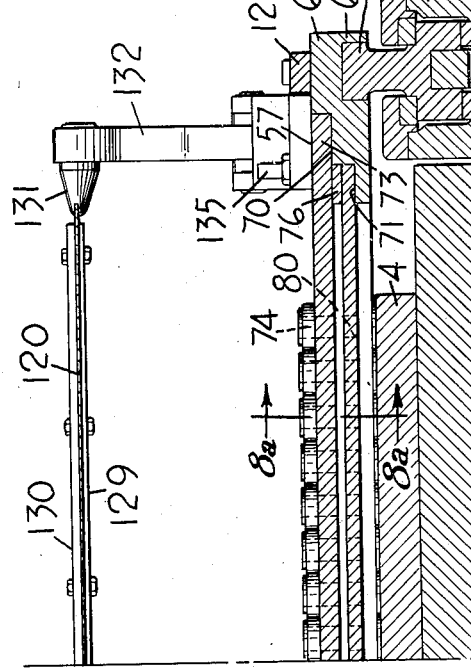
INVENTOR.
Bertrand Japikse
BY
his Attorney

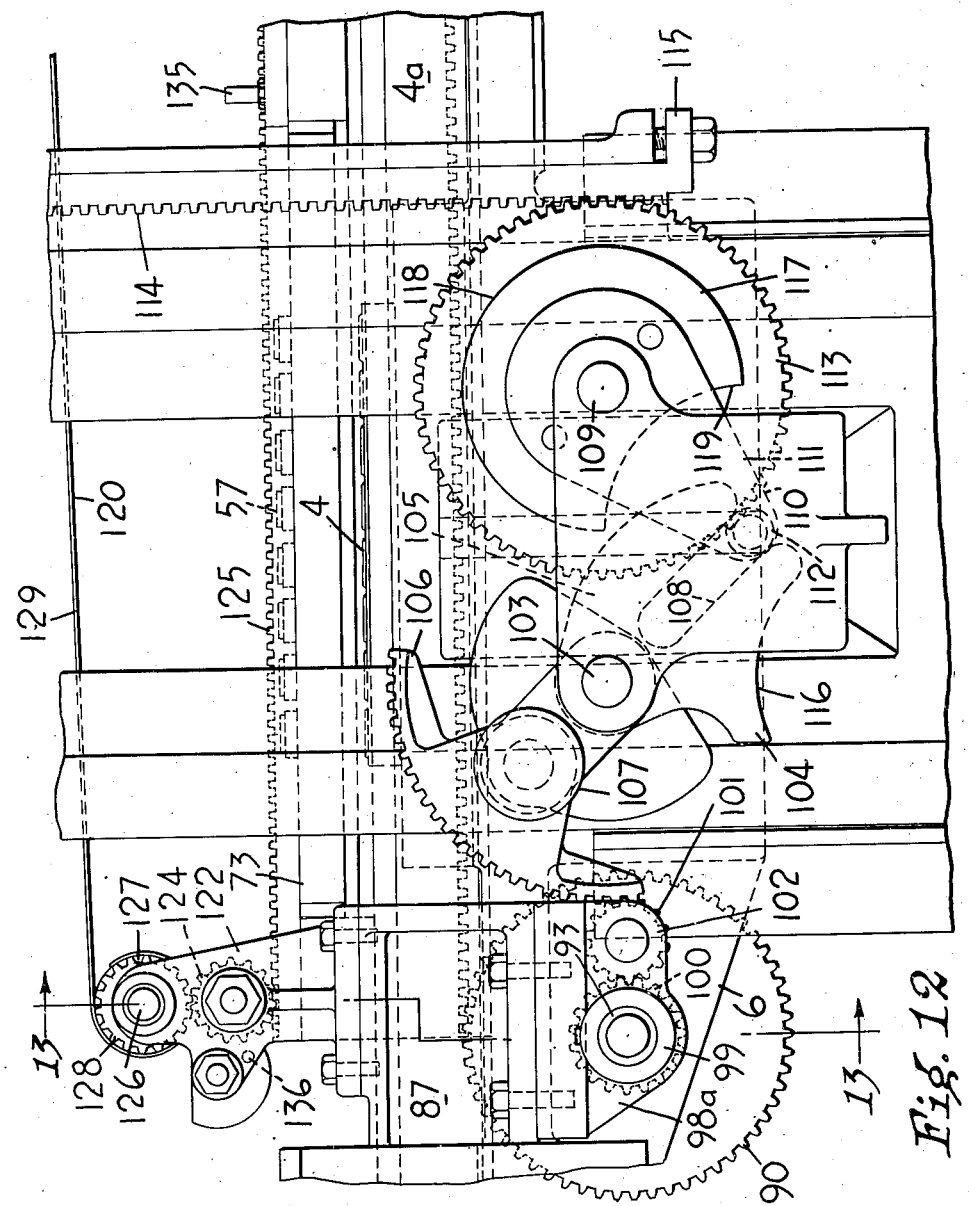

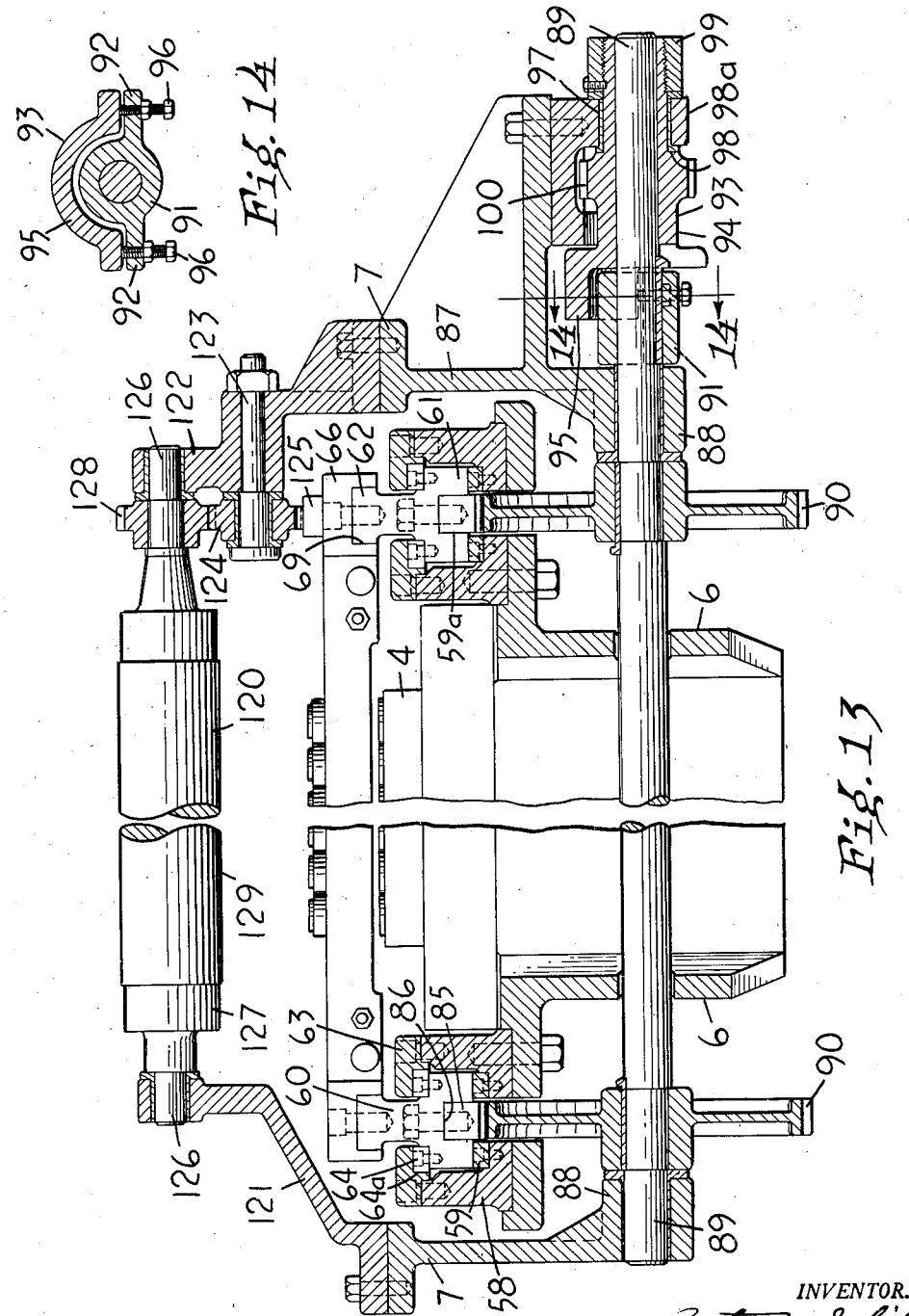

Patented Sept. 13, 1949

2,481,670

UNITED STATES PATENT OFFICE 2,481,670

PRESS MECHANISM

Bertrand Japikse, Reiffton, Pa., assignor to Birdsboro Steel Foundry & Machine Co., Birdsboro, Pa., a corporation of Pennsylvania Application May 15, 1945, Serial No. 593,847

11 Claims. (Cl. 18—16)

This invention pertains to a press mechanism or moulding machine and more particularly to an arrangement whereby articles to be pressed or moulded will be automatically carried to and away from association with a plurality of dies of the press.

The invention has for its main object the provision of means arranged to automatically and uniformly distribute preformed articles on a mould or die.

Another object of the invention is the provision of a delivery device arranged to collect a plurality of preformed articles and deposit them uniformly on a feeding device with the latter arranged to be moved in response to an action of a movable die or mould toward and away from a path of the movable die or mould.

A further object of the invention is the provision of a reciprocating means actuated by a feeding device or mechanism so that the reciprocating means will at all times during the cycle of a pressing or moulding operation be positioned beneath a mould or die to receive fabricated articles deposited thereon from the mould or die.

An added object of the invention is the provision of automatic means arranged with a collecting means for preformed articles so as to permit, at predesignated intervals, a uniform deposit of the preformed articles on a feeding or shuttle device.

A still further object of the invention is the provision of actuating means arranged through the action of a die or mould to move a shuttle or feeding device from one position to another.

Another object of the invention is the provision of lost motion means associated with actuating means for a shuttle device so that the latter will be moved only during a portion of the time consumed in a pressing or moulding cycle.

An additional object of the invention is the provision of a feeding or shuttle device arranged to move into the path of a die or mould during the movement of the latter in one direction and further arranged to move out of the path of the die or mould during movement of the latter in an opposite direction.

An extended object of the invention is the provision of a retractible and extensible means arranged to be moved to a position to receive completed articles from a die or mould during a part of the pressing or moulding cycle and arranged to carry the completed articles away from a die or mould during the reversing part of the pressing or moulding cycle.

These and numerous other objects will become apparent from the succeeding description considered together with the accompanying drawings the latter of which disclose an exemplified form of the invention and wherein:

Figure 4 is a partial horizontal sectional view taken along the lines 4—4 of Figure 3, looking in the direction of the arrows.

Figure 5 is a vertical sectional view taken along the lines 5—5 of Figure 4, looking in the direction of the arrows.

Figure 6 is a partial horizontal sectional view taken along the lines 6—6 of Figure 3, looking in the direction of the arrows.

Figure 8 is a vertical sectional view taken along the lines 8—8 of Figure 7, looking in the direction of the arrows.

Figure 8a is a vertical partial sectional view taken along the lines 8a—8a of Figure 10, looking in the direction of the arrows.

Figure 9 is a horizontal sectional view taken along the lines 9—9 of Figure 8, looking in the direction of the arrows.

Figure 10 is a transverse vertical sectional view taken along the lines 10—10 of Figure 7, looking in the direction of the arrows.

Figure 11 is a vertical sectional view taken along the lines 11—11 of Figure 7, looking in the direction of the arrows.

Figure 12 is a side elevational view taken along the lines 12—12 of Figure 7, looking in the direction of the arrows.

Figure 13 is a transverse vertical sectionl view taken along the lines 13—13 of Figure 12, looking in the direction of the arrows.

Figure 14 is a vertical sectional view taken along the lines 14—14 of Figure 13, looking in the direction of the arrows.

Figure 1:
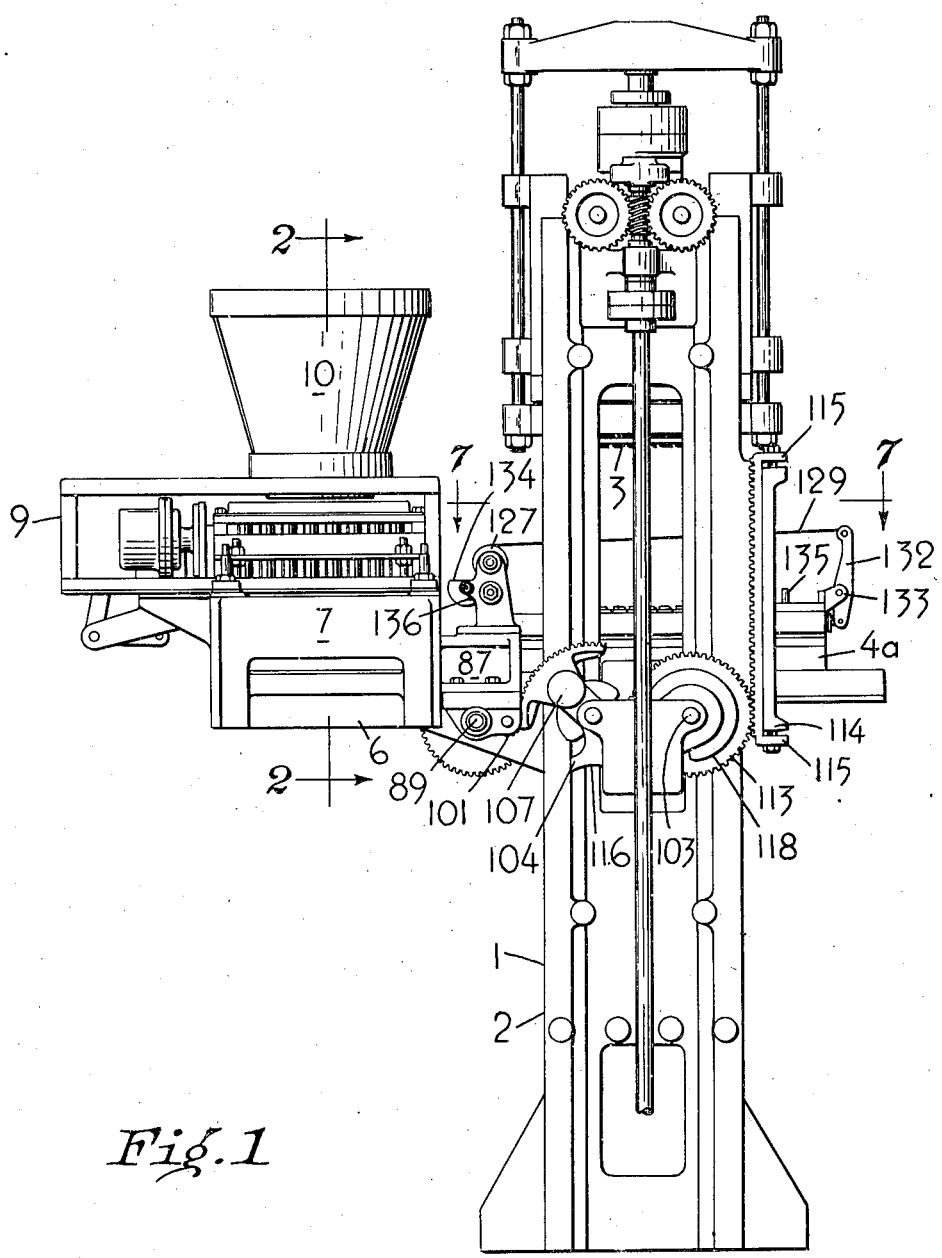
Figure 1 is a side elevational view of a general arrangement of a press mechanism or moulding machine embodying a form of the present invention.

Referring now in detail to the drawings, wherein like reference characters refer to like parts, the numeral 1 is employed to designate, in a somewhat general manner, a press mechanism or moulding machine embodying the present invention. The press and mould proper, identified by the character 2 in Figure 1, may be of the type as described and claimed in United States Patent No. 1,944,571, granted January 23, 1934, to Walter E. Rahm, and in this regard may, if desirable, comprise an upper relatively stationary die or mould 3 and a lower relatively movable die or mould 4, the latter of which, through suitable mechanism not particularly disclosed or referred to, is arranged to move upwardly or vertically along a predetermined path to mate with the stationary die or mould and to complete the pressing or moulding cycle move downwardly to its farthestmost position as illustrated particularly in Figure 1 of the drawings. The purpose of the press and mould proper is to fabricate articles or objects from thermo-plastic or thermosetting material or compound and for the purpose of illustration only the articles or objects may be interiorly threaded caps, covers or closure elements (not shown) commonly employed to be threadedly associated with a tube or container of any design, configuration or description.

In the operation of the press or mould proper, a plurality of uniformly arranged preforms 5 are deposited on the movable die or mould and the latter is then moved upwardly vertically to become contiguous with the stationary die or mould at which time the preforms are distributed throughout suitable cavities in the two dies or moulds to complete the articles being formed. The lowermost or movable die is then moved downwardly away from the upper or stationary die. However, because of the threaded interlock between the completed articles and the thread forming elements (not shown) in the upper die the articles are retained elevated or associated with the upper die until such time as the thread forming elements are rotated to become disengaged from the fabricated articles and at this time the latter drop downwardly away from the recess or cavities of the upper or stationary die or mould.

Means has been incorporated in the press or mould mechanism to automatically deposit uniformly on one of the dies a plurality or multiplicity of preforms and after the completion of a pressing or moulding cycle or operation to gather the completed or fabricated articles and remove them from the press or mould. Toward the accomplishment of the above the movable or lower die or mould is provided with longitudinally extending transversely spaced beams or extensions 6 either formed integrally with or secured rigidly to a movable platen or bolster 4a supporting the lower die so as to form a part thereof and move vertically simultaneously therewith. Removably secured to the sides of the beams are horizontally spaced vertically extending arms 7 which rise above the beams a predetermined distance. The arms are spaced horizontally away from the lower die or mould and have supported thereon through the medium of set screws 8 or any other attaching means on upstanding framework 9 of substantially skeletonized form and which supports, in a somewhat elevated position, a hopper, chute or truncated receptacle 10. Articles such as that referred to above when made from a plastic material or compound are initially made in the nature of pellets and these pellets, commonly called preforms, are then loaded into the hopper whence they start toward the dies or moulds of the press or moulding mechanism. Associated with the arms is a pellet dispensing, loading or distributing device 11 generally comprising longitudinally arranged, vertically extending posts 12. Certain of the posts are tied firmly together with transversely arranged, longitudinally extending, angle-shaped brackets 13 presenting horizontal shelves or ledges 14. Conveniently spaced along the ledges are anchor rods 15 which bisect the shelves to have associated therewith rotatable means or nuts 16 embracing the ledges therebetween and thereby firmly securing the anchor rods to the brackets. The anchor rods project downwardly from the brackets to have their lower extremities reduced in cross sectional area as at 17 (see Figure 5). Sleeved over each reduced anchor rod section is a pair of vertically spaced washers 18 and the extreme end of each rod has a rotatable element or nut 19 associated therewith. Interposed between each set or pair of washers is a resilient pad formed of rubber or any relatively flexible compound or composition 20 with each pad being carried by a stand or clip 21, the latter of which is secured firmly by any desired method or means to a related subjacent arm. Accordingly, the dispensing device is flexibly mounted upon the arms and for this reason will reflect any vibratory forces to which it may be subjected in service. The upper extremities of the post are bridged by a pan or basin 22 which is secured to the posts by any means and is disposed immediately beneath the bottom or lower end of the hopper to function as a catch basin for the pellets within the hopper. Forming the base of the pan or basin is a plate 22a having a series, plurality or multiplicity of symmetrically or uniformly arranged openings 23 which lead into conveyors or tubes 24, the latter of which are secured to the base plate and project downwardly therefrom. There has been disclosed in the drawings an arrangement of a certain number of tubes but it will be clearly understood that this illustrated number is disclosed merely for the purpose of illustration and is not to be construed as a limitation of the invention. In order to maintain the lower extremities of the tubes in a relatively fixed relation, a lower or horizontal tie plate 25 is permanently secured to the tubes so as to form a part thereof.

In connection with the structure thus far considered it will be noted that as the hopper is supplied with preforms they will be directed to the basin. A vibrator 26 is secured or attached to one side of the loading device and when the vibrator is actuated by means of any method (not shown) the loading device will be subjected to external impulses. Because of the rubber or resilient or flexible mounting of the loading device, the preforms within the basin will be somewhat equally distributed within the confines thereof to permit the preforms to find their way into the tubes or conveyors. The vibratory forces will also prevent the tubes from becoming clogged and thus at all times ensure a prearranged or controlled flow of preforms through the conveyors.

Figure 2:
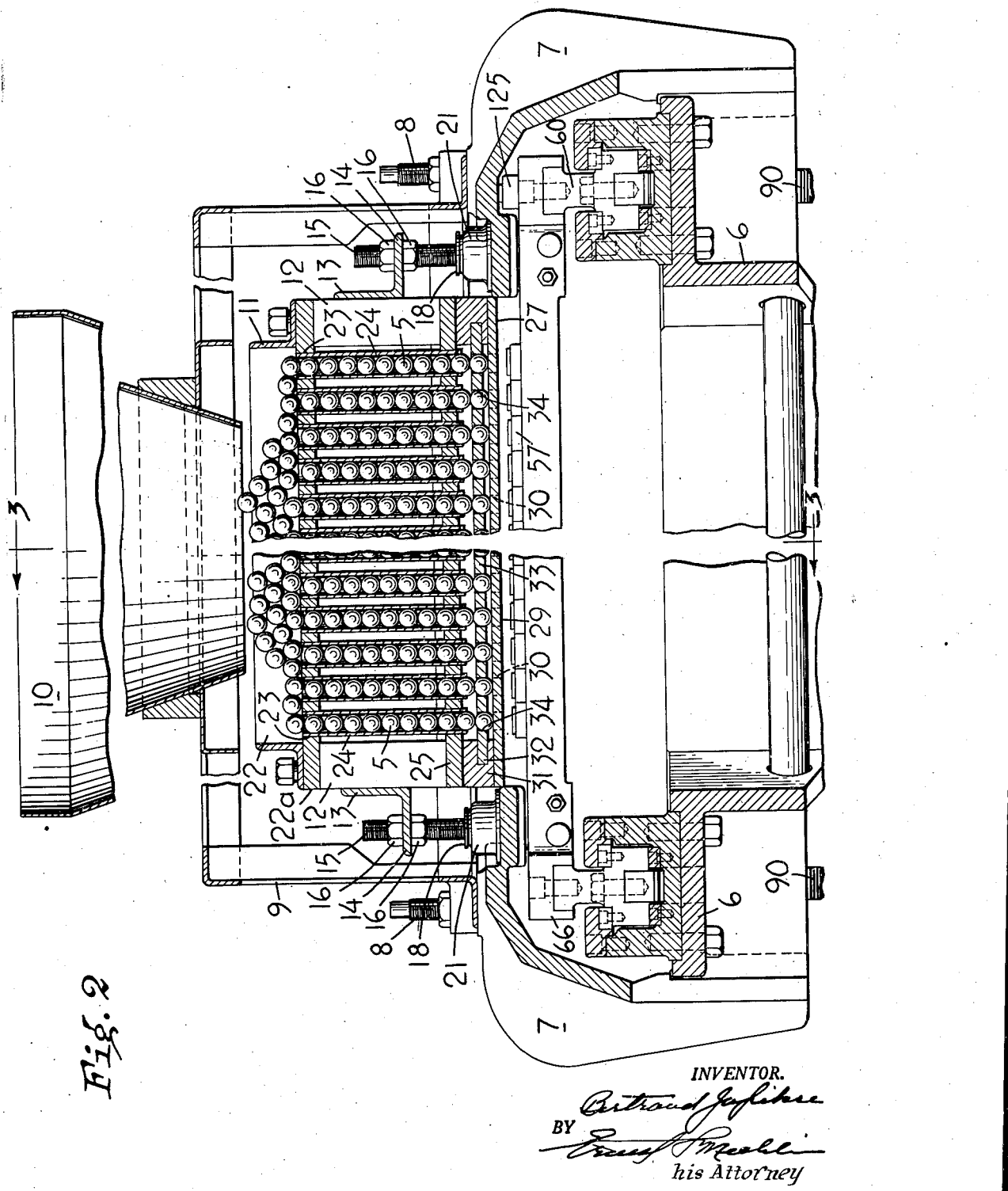
Figure 2 is a partial transverse sectional view taken along the lines 2—2 of Figure 1, looking in the direction of the arrows.
Figure 3:
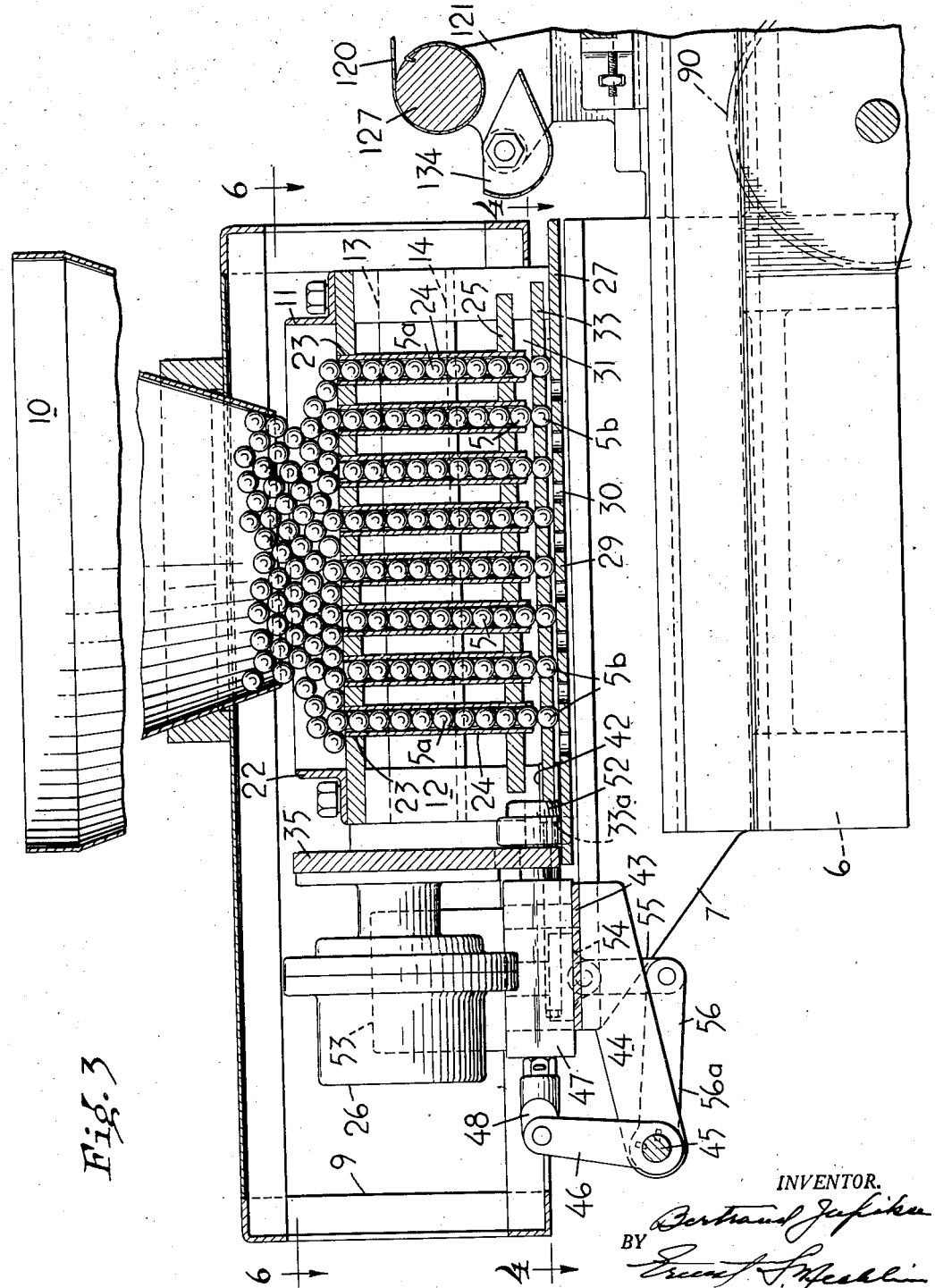
Figure 3 is a vertical sectional view taken along the lines 3—3 of Figure 2, looking in the direction of the arrows.
Figure 7:
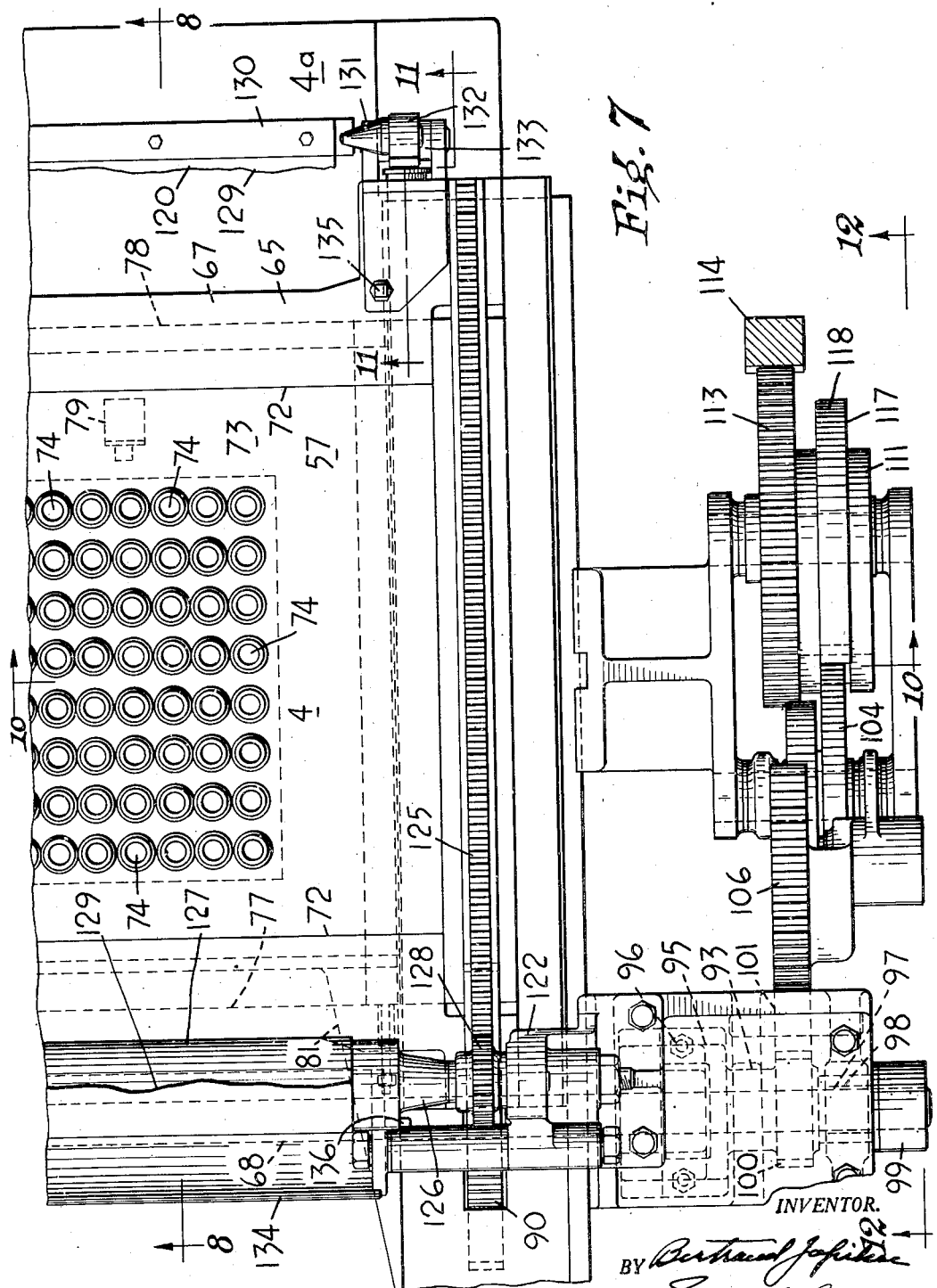
Figure 7 is a partial horizontal sectional view taken along the lines 7—7 of Figure 1, looking in the direction of the arrows.

Means has been provided in the mechanism to intercept and control the flow of preforms from the multiplicity of conveyors or tubes and toward the accomplishment of the above a delivery device or collecting table 27 is associated with the arms in subjacent relation to the tie plate. The collecting table comprises a relatively stationary, lower or bottom plate or leaf 29 which is provided with a multiplicity or series of substantially symmetrically or uniformly arranged openings 30. The latter mentioned openings are each of a diameter of sufficient size to accommodate or receive a pellet or preform and is in vertical misalignment with an overlying tube or conveyor (see particularly Figure 2). The bottom leaf of the delivery device is at all times fixed with respect to the tubes of the pellet dispensing device and accordingly the relationship between the tubes and the openings 30 never varies. The framework of the pellet dispensing device is provided with extensions 31 which are disposed longitudinally of the mechanism and positioned adjacent the transverse edges of the dispensing device. Each extension is carried by the tie plate 25 and in turn carries a related end of the subjacent bottom leaf 29. These extensions 31 present an inwardly and longitudinally extending groove 32 into which project the lateral edges of an upper or top plate or leaf 33 of the collecting table. The top leaf, by reason of its relationship with the grooves, is adapted to be moved or guided along a predetermined path. A multiplicity or series of openings 34 appearing in the top leaf in a somewhat symmetrical or uniform arrangement are of a size sufficient to accommodate or receive pellets and, accordingly, are so disposed as to be normally positioned in vertical alignment with the tubes or conveyors of the dispensing device (see Figure 3). As will be noted by referring particularly to Figure 3 of the drawings, each tube is filled completely with superimposed pellets 5a with the lowermost pellet 5b being positioned in the accommodating openings 34 of the top leaf. These pellets 5b are prevented from falling through the top leaf by the presence of the bottom leaf 29, the latter of which functions during one stage of the pressing or moulding cycle as a support for the pellets 5b within the top leaf openings and all surmounted pellets 5a occupying the tubes or conveyors because, as previously pointed out, the openings 30 of the bottom leaf are normally in misalignment with the tubes and, accordingly, are in misalignment with the openings 34 of the top leaf.

Overlying one end of the distributing device and secured thereto so as to form a part thereof is a vertical end wall 35 which functions in part as a mounting for the vibrator 26. Outstanding horizontally from adjacent a lower edge of the end wall is a pair of transversely spaced barrels 36 forming housings for encased spring means or coil springs 37. The coil springs react longitudinally of the mechanism to bear against the end wall in one direction and against closing walls 38 of the barrels in an opposite direction, thus tending to urge the barrels away from the end wall. Threaded through each barrel and associated spring is a shank 39 of a plunger 40 which has associated therewith a nut 41, the latter forming a barrier against which the barrels bear. The inner end of each shank is provided with a jaw 42 secured to the top leaf of the delivery device and if unarrested, the springs, through the medium of the shank, will shift the top leaf longitudinally of the mechanism or device to align the openings of the top and lower leaves of the collecting table. This movement or rearward stroke of the top leaf is limited or measured by the trailing edge 42a of the jaws 42 coming to rest against the end wall. When such a shifting action of the top leaf is permitted or effected the lowermost pellet 5b will roll or slide along the lower leaf until the openings of both plates are in vertical alignment at which time the pellets 5b will drop through the openings of the lower plate. During this shifting action of the top plate the preforms 5b will slide from beneath the preforms 5a and the lowermost of the pellets 5a will come to rest upon an unapertured part of the top plate to have their then dropping movement arrested. As will be noted, as soon as the top plate is returned to its normal position, that is, after the pellets or preforms 5b have dropped through the openings of the bottom plate, the lowermost of the pellets 5a will be retained in top leaf supported position until such time as the openings of the top plate appear beneath the lowermost of the preforms 5a at which time they will drop another step into the top plate openings to come to rest upon an unapertured part of the lower leaf as illustrated most clearly in Figure 3 of the drawings. In order to control the shifting movement of the top leaf of the collecting table there is provided a horizontal base or bed plate 43 bridging the distance between the arms and secured thereto by any desired means. Extending downwardly and horizontally from the bed plate are a pair of transversely spaced hinge butts 44 which carry at their free outermost extremities a rotatable hinging pin 45. Suitably keyed to the hinging pin intermediate the ends thereof and preferably in overlying relation with the hinge butts are a pair of upwardly extending crank arms 46 arranged to move with the hinging pin in response to a rotative action thereof. The base plate also functions as a support for a pair of conveniently and transversely spaced cylinders 47 which extend longitudinaly of the mechanism and each have extending therethrough a top leaf actuating means or piston 48. An outer extremity of each piston is preferably pin-connected to an upper or free end of an associated and aligned crank arm so as to be moved therewith while intermediate the ends of the piston appears a shoulder or enlargement 49, the latter of which assits in guiding the piston along a true path. Sleeved over each piston is a compression or coil spring 50 which acts against a wall of the related cylinder and shoulder to urge the piston horizontally in a direction toward the collecting tables. An adjustment means, in the nature of a nut 51, is associated with each piston so as to limit the amount of travel of the piston in one direction. The inner end of each piston has attached thereto a resilient or rubber bumper or snubber 52 arranged to bear against the top leaf so that through the action of the compression springs the snubbers will maintain the top plate in a normal position and, accordingly, the openings of the top plate out of vertical alignment with the openings of the bottom plate. The rubber bumpers are incorporated in the mechanism to avoid any rigid retention of the distributing device so as not to interfere with the vibration thereof. The bed plate carries adjacent one end thereof a solenoid 53 which may be of any design and operated through the medium of any means (not shown). Depending from the solenoid is an actuating arm 54 which, through a link 55, is pivotally connected to an end of a lever 56 with the latter having an outer extremity 56a key-connected to a free end of the hinging pin. It will, therefore, be observed that when the solenoid is energized, the hinging pin will be rotated to cause the snubbers of the pistons to draw away from the top leaf and this action will result in the plungers, through the action of the springs 37, pulling the top plate in a corresponding direction until the top plate comes into contact with the end wall at which time the pellets or preforms 5b will drop through the openings in the bottom plate or leaf.

Arranged to move from a normal position from beneath the delivery device or collecting table to an abnormal position over the movable die or mould when the latter is completely spaced away or downwardly from the stationary die or mould is a shuttle or feeding device or transfer means 57. Functioning as a support or carrier for the shuttle device is a pair of cradles 58 of channel or U-shape in vertical cross section and extending for substantially the full length of each beam and the movable die or mould. Each cradle extends longitudinally of the mechanism and is desirably removably secured to a related beam and the lower die by any method or means. Each cradle is provided with fixed transversely spaced bottom liners 59 presenting a space 59a therebetween and these liners are preferably coextensive with the cradles. Mounted upon each set of cradle bottom liners is a transfer rail 60 each being of a length less than that of an associated cradle but, however, of sufficient length to underlie longitudinally the shuttle or feeding device. Each rail, arranged to move longitudinally of the mechanism through the medium of actuating means hereinafter described in detail, desirably comprises a lower foot or block 61 and a reduced upper head 62 with the foot of each rail arranged to contact and slide along the bottom supporting liners. Removably secured to each cradle are upper transversely spaced, longitudinally extending caps 63 bearing downwardly against and in sliding contact with liners 64 with the latter removably secured to the foot of a related rail. Thus a guideway is defined between the upper caps and lower liners along which the rails and upper liners may travel in service. Also the upper liners bear transversely against the caps as at 64a to further define the path of travel of the rails.

Tying the two transversely spaced longitudinally movable rails together is a shuttle device frame 65 generally comprising laterally spaced rail covers 66 joined rigidly at adjacent ends by a forward or front cross head 67 and a rear or back cross head 68. Each rail cover is provided with a downwardly facing recess or relief 69 disposed adjacent an outer edge of the cover and neatly accommodating a related rail head. Stud bolts or any desired securing means are employed to attach the rail covers to the rails in order to join firmly these components. A rail cover is made of stepped arrangement in vertical transverse section (see Figure 10) and as such presents a series of steps or upper and lower shelves 70 and 71 extending inwardly and downwardly of the mechanism. The front and rear cross heads each have a longitudinally and transversely extending lip 72 which rests upon the upper shelves 70 of the rail covers with the remaining portions of the cross heads projecting laterally there beyond to present inverted reliefs to embrace related portions of the rail heads. The extremities of the cross heads are also provided with bolts or locking means of any desired nature which secure the cross heads to the subjacent rails. With the cross heads and rail covers thus securely fastened to the rail heads, the shuttle device frame 65 is capable of moving as a unit.

Forming a part of the shuttle or feeding device is a top cover or stationary plate 73 arranged to occupy completely the space between the rail covers and cross heads and as such abut the lips of the cross heads and rest upon the top shelves or steps of the rail covers. Locking means of any nature are associated with the top plate adjacent the transverse edges thereof to fasten the cover plate to the rail covers. The cover plate is provided with a plurality or multiplicity of openings 74 conveniently, symmetrically or uniformly arranged and disposed in such a relationship so as, at certain predetermined intervals, to be in vertical alignment with the openings in the relatively stationary bottom plate of the collecting table. Accordingly, when the series, plurality or multiplicity of preforms or pellets 5b are permitted periodically to drop through vertically aligned openings of the top and bottom plates of the delivery device the cover plate of the feeding device is positioned in subjacent relation to the collecting table so that the apertures of the cover plate will receive the pellets or preforms such as are illustrated at 5c in Figures 8a. These pellets or preforms will be maintained for a predetermined definite period within the cover plate apertures by an unperforated portion of a shifting or movable base plate 75. The base plate 75 is spaced a predetermined distance below the cover plate and, like the latter, forms a part of the shuttle device but, as contradistinguished therefrom, is arranged to move along a fixed limited path relative to the cover plate. Accordingly the base plate extends transversely of the shuttle device to such an extent that its transverse limits rest upon the bottom shelves 71 of the rail covers. Liners or wear plates 76 are secured to and beneath the cover plate in vertical alignment with the bottom shelves to thus maintain the base plate at a fixed elevation. The horizontal extent of the base plate is less than the normal distance between the bulkheads 77 and 78 of the rear and forward crossheads respectively and, because of this relationship, the base plate is permitted a longitudinal movement relative to the cover plate or feeding device frame. As previously indicated, the shuttle or feeding device is arranged to move along the cradle from a position beneath the delivery device or collecting table to a position overlying the movable or lower die or mould, this latter position being clearly illustrated in Figures 7 through 12. When shifted to the latter position, the base plate, normally bearing against the bulkhead 78 of the forward crosshead, is arranged to strike a stop 79 prior to the completion of the stroke of the feeding device in a corresponding direction; that is to say, in a direction away from beneath the collecting table. This arresting of the base plate permits the cover plate to travel to the end of its stroke. The base plate is also provided with a plurality or multiplicity of symmetrically arranged apertures 80 which are normally held out of vertical alignment with the apertures of the cover plate as clearly illustrated in Figure 8a of the drawings. However, when the base plate strikes or comes to rest against the stop 79 (see Figure 8) the apertures of the base plate are brought in vertical alignment with cavities or pellet receiving recesses 4b in the bottom die or mould. A continued forward movement of the frame and cover plate will result in the relationship between the openings 74 and 80 changing from misalignment as shown in Figure 8a to vertical alignment as shown in Figure 8. In other words, a shifting of the base plate within the frame will result in the vertical alignment of the apertures in the cover and base plates to permit the pellets or preforms 5c to drop out of the apertures 74 through the apertures 80 and into the bottom die cavities. Thus a uniform, prearranged or symmetrical group or multiplicity of preforms are evenly and automatically deposited on, delivered to or distributed over the movable die or mould preparatory to the movement of the latter upwardly to be mated with the upper die or mould 3 in the process of forming completed articles.

As previously stated, the base plate is maintained normally in such an advanced position that its apertures are out of vertical alignment with the apertures of the overlying cover plate (see Figure 8a). This is accomplished through the medium of a resilient or yieldable means 81 characterized by a pin or guide bar 82 being slidably associated with a bore 83 formed in the rear cross head adjacent to its transverse limits (see Figure 9). These guide bars which are in horizontal alignment with the base plate have their inner ends secured to blocks 84a bearing against recessed notches in the base plate and each is provided with a coil or compression spring 84 reacting longitudinally of the mechanism against the rear bulkhead and the base plate. When the base plate comes to rest against the stop 79 the coil springs are compressed additionally so that as the shuttle device is moved away from over the movable or lower die the springs 84 will urge the base plate forwardly until it comes to rest against a forward cross head bulkhead 78 at which time the apertures of these two plates (see Figure 8a) will again be out of vertical alignment for the base plate to support another series of preforms 5c in the cover plate apertures.

As previously stated the shuttle or feeding device or transfer table is arranged to move from beneath the delivery device or collecting table to a position over the lower or movable die and toward the attainment of the above a part of the space 59a between each set of bottom liners is occupied by a rack 85 positioned in a suitable downwardly opening groove 86 formed in a related rail foot. Each rack is firmly secured to an associated rail so as to be capable of movement simultaneously therewith. The arms 7 are provided with extensions 87 which project longitudinally of the mechanism toward the lower platen or movable die. Instanding of the mechanism from each arm extension in subjacent relation to the track is a bearing 88 disposed adjacent the transverse limits of the mechanism and functioning as a free rotatable support for an axle or rotatable shaft 89 (see Figure 13). The shaft extending through suitable openings in the beams has fixed thereto through the medium of keys or any such means a pair of driven gears 90 each of which extends through a suitable accommodating opening in a beam and cradle to be in vertical alignment and intermeshed with an overlying rack so that any movement of the driven gears will be reflected in the racks and the shuttle or feeding device.

Driving means is associated with the shaft 89 to impart a rotary movement thereto and a reciprocatory movement to the shuttle or feeding device. Such driving means is exemplified by a take-up coupling 91 sleeved over the shaft and positioned outwardly of the mechanism in the close proximity to one of the bearings 88. The take-up coupling keyed to the shaft so as to form a rigid or removable part thereof has horizontally, longitudinally or outwardly extending wings 92 desirably spaced to one side of and parallel with a plane passing through the axis of the shaft. Sleeved over the shaft in the close proximity of the take-up coupling is a pinion shaft 93 comprising a tubular shaft accomodating or encircling trunk 94 which terminates at one extremity in an arcuate or semi-circular hood 95. The hood overlies a portion of the take-up coupling and in order to transmit a rotative action from the pinion shaft to the take-up coupling the wings of the latter are arranged to carry rotatable or adjustable elements in the form of set screws 96 which abut the extremities of the pinion shaft hood (see Figure 14). This adjustment between the pinion shaft and take-up coupling is provided in the arrangement forming the driving means because the take-up coupling is connected to a hereinafter described construction which does not lend itself well to minute adjustments after assembly and such minute adjustment or adjustments is desirable while not absolutely necessary. It will be noted that by loosening and tightening the respective set screws carried by the take-up coupling the relationship between the hood and wings can be altered and also it will be observed and recalled that a driving force is imparted to the shaft from the pinion shaft through the take-up coupling only and necessarily the set screws. If, therefore, after assembly or continued use it is found that when the base plate of the shuttle device strikes the stop 79 and subsequently after a final or complete action or movement of the feeding device in a corresponding direction, the apertures of the cover plate do not align vertically with the corresponding apertures of the base plate to permit a free release of the preforms or pellets 5c then, in that event, without disturbing any of the hereinafter described driving means the set screws may be manipulated to move the transfer table until the desired alignment of the apertures is accomplished.

The pinion shaft has a circumambient bushing 97 abutting a shoulder 98 formed on the pinion shaft at a location removed from the hood to prevent an unwarranted shifting of the pinion shaft along the shaft outwardly of the mechanism (see Figure 13). The bushing is encased in a hanger 98a which is removably secured to a related arm extension to thus assist in maintaining the shaft in a true alignment. An extremity of the pinion shaft removed from the hood extremity is exteriorly threaded and has interlocked therewith a rotatable element or nut 99. The nut, it will be observed, acts axially of the shaft against the hanger to prevent the pinion shaft from shifting inwardly of the mechanism. Any common expedient such as the use of set screws may be employed to prevent an accidental rotatable movement between the nut and pinion shaft.

Formed integrally with the pinion shaft intermediate the bushing and hood thereof is a pinion 100 in meshing relation with a floating pinion 101 the latter of which is suitably supported by a bracket 102 formed with or as a part of the hanger 98. Spaced toward the moving or movable platen from the floating pinion and having an axis extending transversely of the mechanism and preferably in horizontal parallel relation with the axes of both pinions is an auxiliary shaft 103 (see Figure 12) suitably journaled in or rotatably fixed to or supported by the moving platen. The auxiliary shaft carries a Geneva cam 104 which has a plate-like portion extending, at one time during the operation of the mechanism from the shaft, in a direction downwardly of the mechanism and away from the pinions. Extending in an opposite direction the Geneva cam has a wing 105. In the close proximity to the Geneva cam inwardly of the mechanism is a gear segment 106 also carried by the auxiliary shaft 103 and anchored to the Geneva cam by means of a locking pin 107 so that any rotary movement of the Geneva cam about the auxiliary shaft will be reflected in the gear segment. The gear segment has teeth intermeshed with teeth of the floating pinion and this arrangement thus transfers a motion of the Geneva cam to the driving gears and shuttle device.

It is of course desired that the shuttle or feeding device be moved from beneath the delivery device as the movable platen or die is moving downwardly or away from the upper or stationary die so that as the movable die reaches the limit of its downward stroke the pellets 5c are released from the shuttle device and delivered to or deposited on the movable die. The entire movement of the shuttle device over the movable die is accomplished during only a portion or last part of the downward stroke of the movable die so that sufficient clearance has been developed between the two dies to permit the introduction of the shuttle device therebetween. In like manner, the initial movement of the shuttle device away from over the movable die is initiated at the beginning of movement of the lower die or platen toward the upper die and this shuttle device movement is completed during the first stages of the lower die's upward movement so that the shuttle device and other components hereinafter more fully described in detail are completely out of the path of the dies well prior to the mating of the dies. Further, it will be observed that during the period that the shuttle device is positioned out of the way of the path of the dies and at rest beneath the delivery device the solenoid 53 is tripped to release another series of pellets 5b from the collecting table so as to again load the transfer table in preparation for a subsequent movement of the transfer table over the movable die.

Toward the attainment of the above the Geneva cam is provided with a slot or guideway 108 opening outwardly of the cam and having a center line bisecting the axis of the auxiliary shaft (see Figure 12). When the shuttle device is in position over the movable mould this slot in the cam is directed downwardly of and toward the movable platen in a direction away from the auxiliary shaft 103. Spaced horizontally from the auxiliary shaft and also in horizontal alignment with the shaft is a trunnion 109 fixed to, carried or suitably supported by the movable platen and having formed therewith or attached thereto an arm 110 comprising radially extending and transversely spaced fingers 111. A roller 112 is rotatably mounted between the fingers adjacent a lower extremity thereof with the roller being of a diameter to be neatly accommodated by or travel along or within the Geneva cam slot. Also attached to the trunnions inwardly of the mechanism from the arm is a main or driving gear 113 which is adapted to move as a unit with the arm. Mounted upon the press proper, indicated by the reference character 2, is a stationary vertical rack 114 supported through the means of suitable brackets 115, the latter of which are secured to or form a part of the press proper but, however, removed or disassociated from the movable platen thereof. The stationary rack is so arranged in alignment with the main or driving gear that the two are intermeshed and since the driving gear is carried by the movable platen any vertical movement of the latter will be reflected in a rotary movement of the trunnion or rotary arm 110.

It will be observed at this time that when the movable platen is at its lowermost position the roller 112 is disposed at or near the entrance of the slot. When, therefore, the movable platen starts upwardly, a clockwise motion is imparted to the arm thus causing the roller to move inwardly of the slot and causing a counterclockwise motion to the Geneva cam and gear segment. This latter motion will be reflected in a clockwise motion of the floating pinion and a counterclockwise motion of the shaft and driven gears to result in a withdrawal of the shuttle device from the press proper. Also it is to be noted that the rate or speed of the feeding device changes during its travel into and out from the press. This change in rate or speed is actually a relatively slow or cushioned start, an accelerated travel during the interim of the transfer table movement in one direction and a relatively slow and cushioned ending. The result attained by this change of movement is that the movement of the shuttle device in either direction is definitely controlled and moved in and out of the press in the least possible time so as to simplify the entire construction. By thus having a relatively short stroke of the movable platen the cycle of the press, or in other words, the time consumed by a complete upward and downward movement of the movable platen or die or mould, is of short duration, thus increasing the productivity of the mechanism. In actual practice and merely for the purpose of illustration and not intended as a limitation, it has been arranged for the movable die of the illustrated mechanism to move through a vertical stroke of eighteen inches and it is during only a part of this eighteen inch stroke that the shuttle device has completed a horizontal stroke of thirty inches. The change of rate or speed during the movement of the shuttle device is accomplished by the relationship between the arm and Geneva cam. It will be noted that when the main or driving gear is actuated in a clockwise direction the roller will travel in a like direction causing the Geneva cam to travel in a counterclockwise direction by the movement of the roller toward the inner or closed end of the slot. While the rate or speed of the driving gear and arm is constant throughout their rotary movement the movement of the roller inwardly of the slot is relatively slow at first to increase in speed as it approaches the inner extremity of the slot. Conversely the rate of travel of the roller from the interior of the slot to its outer or open extremity varies or decreases as the roller approaches the open end of the slot. This action is, therefore, reflected in a corresponding action of the shuttle or feeding device or in a change of rate or speed of the travel of the latter. As previously stated, the shuttle device is arranged to start and complete its travel toward and over the bottom die or mould during a portion of the vertical movement of the latter so that during the remaining portion of the vertical movement the feeding device is at rest. This lost motion is accomplished by providing the Geneva cam with a concave cam face 116 (see Figure 12) exposed to a direction away from the cam slot and preferably of a predetermined curvature the center of which coincides with the axis of the trunnion 109 when the Geneva cam is in a certain position. Mounted between the fingers 111 is a disc or drum 117 having a convex cam face 118 concentric with the axis of the trunnion 109. Accordingly, the two cam faces are of substantially equal radii with only a slight difference therebetween to permit one or the convex cam face to slide relative to the other or concave cam face. The drum is cut away as at 119 thus permitting the Geneva cam to rotate within certain limits in a counterclockwise direction and a clockwise direction without any interference by the drum. It will therefore be observed that when the lower or movable platen starts to ascend the driving gear and rotated arm will rotate in a clockwise direction imparting a counterclockwise motion to the Geneva cam and gear segment, thus moving the shuttle device away from over the movable die. This action continues until the roller 112 moves entirely out of the slot at which time the concave cam is nested, mated or meshed with the convex cam so that a continued upward travel of the movable platen will result in a sliding action between the cam faces and a discontinuation in the movement of the shuttle device; the latter of which at this time has reached a position entirely beneath the collecting table. The meshing cam faces thereby prevent accidental displacement of the shuttle device while the press is closed. In like manner, upon a lowering action of the movable platen, the shuttle device will remain at rest removed from the lower die until such time as the roller, carried by the fingers, again enters the slot in its counterclockwise movement when this coaction will result in the convex cam face and concave cam face being disengaged and thus cause a free clockwise motion to be imparted to the Geneva cam and a movement of the shuttle device to a position over the movable die.

A gathering or apron device has been incorporated in the mechanism to receive the completed articles as and when they are released from the upper die or mould and to carry the completed articles away from the path of the dies. As clearly pointed out in the Rahm patent above referred to in the type of machine covered thereby the completed fabricated or finished articles are retained by the upper die or mould when the dies or moulds are separated. This condition exists until the thread forming portions of the upper die or mould are rotated sufficiently to permit the articles to become disengaged from the thread forming portions at which time the articles are free to drop from their related cavities in the upper die or mould. If the articles are not arrested in their downward movement after release from the upper die it is quite apparent that they will fall upon the lower die or any object of the mechanism or floor therebeneath. Accordingly, so as to prevent any interruption in the continual movement or repeated cycles of the press a gathering or apron device indicated generally by the reference character 120 is associated with the mechanism. The gathering or apron device is characterized by a pair of transversely spaced bearing stands 121 and 122 mounted upon the arms 7 at a position removed from the loading device. The bearing stand 122 which is on what may be termed the near side of the mechanism carries, through the medium of a suitable shaft 123, a free running or idling gear 124 disposed inwardly of the mechanism from the related stand. The shuttle or feeding device carries an operating rack 125 which faces away from the direction of the rack 85 with the operating rack being positioned directly over or in vertical alignment with one of the racks 85 which is on the near side of the mechanism (see Figure 13). Since, therefore, the operating rack moves in a reciprocatory manner with the shuttle device and this rack is intermeshed with the idling gear any longitudinal movement of the operating rack will result in a rotary movement of the free running gear. Spanning the distance between the bearing stands and having its extremities rotatably associated therewith is an axle 126 of a spool or roller 127. The spool axle inwardly of the bearing stand 122 has keyed or otherwise secured thereto a gear 128 which intermeshes with and is driven by the idling gear so that any rotative movement of the latter will be transmitted to or reflected in the spool gear. The spool has an inner end of a curtain or sheet 129 of any optional material secured thereto with the major portion of the flexible sheet or curtain wrapped about the spool when the shuttle device is positioned at rest beneath the delivery device. The other or free end of the curtain or sheet has fixed or attached thereto a bridge or beam member 130 having studs 131 extending transversely of the mechanism from the lateral limits of the beam member (see Figures 7 and 10). The studs are suitably and freely journaled in the upper extremities of vertically extending, laterally spaced levers 132 which are pivotally mounted intermediate their ends to hangers 133. The hangers are carried by or suitably secured to the leading or forward crosshead so that after the movable die has descended a predetermined distance and the shuttle device is moved from a position beneath the collecting table to a position over the movable die, the spool is rotated in an unwinding curtain or apron action. The levers, however, maintain the apron extended substantially horizontal and because the levers are carried by the leading edge of the feeding device they introduce the curtain into the space between the dies. This relationship and association permits the sheet to be stretched beneath the upper or stationary die completely blanketing the feeding device and lower die at a time when the articles are being released from the upper die or mould and in this manner the completed articles are gathered in a restricted area above or removed from the transfer table and bottom die.

Also journaled in the bearing stands and extending therefrom is a scuttle or receptacle or bin 134 opening upwardly of the device and disposed below or to one side of the spool. After the preforms 5c have been released from the shuttle device and the latter starts toward the collecting table the curtain is wound once more about the spool. During this winding action of the curtain the fabricated articles are carried along by the curtain or sheet out of the path of the dies so that they fall off of the curtain into the bin. Prior to the completion of the travel of the shuttle device from over the movable die a stop 135 carried by the leading crosshead strikes a pin or knob 136 outstanding from the side of the bin to cause a rotary clockwise motion of the bin about its journals thereby tipping or overturning the bin to empty it of its contents or collection of completed articles. Any means such as a removable shipping or storage container (not shown) may be positioned beneath the bin to receive the completed articles as they are discharged from the scuttle.

Means has been incorporated in the mechanism to keep the curtain relatively tight at all times and such a means is exemplified in a housing 137 being formed in the leading crosshead in longitudinal alignment with a lower extremity 138 of each lever 132 (see Figure 11). Disposed within the confines of each housing is a compression spring 139 having an innermost extremity bearing directly against a follower 140 with each follower being removably and adjustably secured to an inner end of a yoke 141. The other or outer extremity of each compression spring reacts against a thimble 142 which is interlocked by means of suitable threads with the leading crosshead. The free or outer end of each yoke is pin-connected to the lower extremity of an associated or aligned lever and thus the compression spring tends to expand in a direction inwardly of the accommodating housing to maintain, through the medium of levers, the sheet stretched at all times during its winding and unwinding movements.

From the illustrated construction and above description thereof, it will be observed that various changes may be made to this illustrated and described construction without departing from within the spirit of the invention and scope of the appended claims.

I claim:

1. In a mechanism, the combination of, an upper stationary die and a vertically movable lower die, a feeding device arranged to uniformly deposit a plurality of preforms on said movable die, and operable means responsive to a movement of said lower die for shifting said feeding device; said operable means being arranged to start said feeding device toward a position directly over said movable die in response to a downward movement of the latter and start said feeding device toward a position spaced to one side of said movable die in response to an upward movement of said movable die.

2. In a mechanism, the combination of, an upper stationary member and a vertically movable lower member, a feeding device arranged to uniformly deposit a plurality of preforms on said movable member, and means connecting said lower member and feeding device; said means being operable in response to a vertical action of said movable member for shifting said feeding device over and away from said movable member.

3. In a mechanism, the combination of, a stationary die and a vertically movable die, means carrying said movable die, a feeding device arranged to uniformly deposit a plurality of preforms on one of said dies, means motivated by a vertical action of said first named means for shifting said feeding device over and away from one of said dies, and means moved by said feeding device beneath one of said dies for receiving fabricated articles at the completion of a full cycle of said movable die.

4. In a mechanism, the combination of stationary and movable dies, a feeding device arranged to deposit a plurality of preforms on said movable die, said feeding device comprising upper and lower plates having normally misaligned openings, the openings of said upper plate arranged to accommodate preforms and said lower plate normally supporting said preforms in said upper plate openings, a curtain arranged to be unwound by said feeding device beneath said stationary die to receive fabricated articles at the completion of a full cycle of said movable die, and means associated with said curtain for collecting said fabricated articles.

5. In a mechanism, the combination of, a stationary and a vertically movable die, a feeding device arranged to uniformly deposit a plurality of preforms on one of said dies, and means for moving said feeding device; said means being so arranged and constructed as to completely move said feeding device over one of said dies during a partial downward travel of said movable die and completely move said feeding device away from one of said dies during a partial upward travel of said movable die.

6. In a mechanism, the combination of, a stationary and a vertically movable die, a feeding device arranged to uniformly deposit a plurality of preforms on one of said dies, and means for moving said feeding device; said means being so arranged and constructed as to completely move said feeding device horizontally over one of said dies during a completion of a downward movement of said movable die and completely move said feeding device horizontally away from one of said dies during the beginning of an upward travel of said movable die.

7. In a mechanism, the combination of, a stationary die and a movable die, means for carrying said movable die, track means carried by said means, a feeding means carried by said track means and arranged to deposit uniformly a plurality of preforms on one of said dies, and means carried by said first named means; said last named means being motivated by a vertical action of said first named means for moving said feeding device along said track means over and away from one of said dies.

8. In a mechanism, the combination of, a stationary and a movable die, means carrying said movable die, track means carried by said means, a delivery device positioned above said track means, a feeding device carried by said track means, means responsive to an action of said feeding device for releasing a plurality of preforms from said delivery device for uniform deposit on said feeding device, and means for releasing preforms from said feeding device.

9. In a mechanism, the combination of, an upper stationary die and a lower movable die, means carrying said lower die, track means carried by said means, a delivery device positioned above said track means, a feeding device carried by said track means, means for releasing a plurality of preforms from said delivery device for uniform deposit on said feeding device, and collecting means responsive to the movement of said feeding device and arranged to underlie one of said dies.

10. In a mechanism, the combination of, an upper stationary die and a lower movable die, means carrying said lower die, track means carried by said means, a feeding device carried by said track means and arranged to deposit uniformly a plurality of preforms on one of said dies, and collecting means actuated by said feeding device and adapted to be interposed between said dies when the latter are separated for collecting formed articles retained by said upper die.

11. In a mechanism for forming plastic articles, the combination of, an upper die and a lower die, and means operable in response to a movement of said dies toward and away from one another and arranged to move between said dies for a uniform deposit of preforms on one of said dies as said dies are moving apart; said means being further arranged to move from between said dies carrying completed plastic articles from one of said dies as said dies are moving toward one another.

BERTRAND JAPIKSE.

REFERENCES CITED

The following references are of record in the file of this patent:

UNITED STATES PATENTS

| Number | Name | Date |
|---|---|---|
| 1,800,849 | Stacy | Apr. 14, 1931 |
| 2,054,476 | Derry et al. | Sept. 15, 1936 |
| 2,312,215 | Howie, Jr. | Feb. 23, 1943 |
| 2,332,937 | Schmidberger | Oct. 26, 1943 |
| 2,347,972 | Scott, Jr., et al. | May 2, 1944 |
| 2,365,849 | Strauss | Dec. 26, 1944 |
| 2,371,195 | Strauss | Mar. 31, 1945 |
| 2,375,252 | Sayre | May 8, 1945 |
| 2,385,311 | Strauss | Sept. 18, 1945 |
| 2,409,725 | Whitmore et al. | Oct. 22, 1946 |